(12) United States Patent
Kuboshima et al.

(10) Patent No.: US 7,325,395 B2
(45) Date of Patent: Feb. 5, 2008

(54) EXHAUST GAS PURIFICATION DEVICE OF INTERNAL COMBUSTION ENGINE

(75) Inventors: Tsukasa Kuboshima, Okazaki (JP); Shigeto Yahata, Obu (JP); Kazuharu Tochikawa, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/399,361

(22) Filed: Apr. 7, 2006

(65) Prior Publication Data

US 2006/0225409 A1   Oct. 12, 2006

(30) Foreign Application Priority Data

Apr. 8, 2005   (JP) .............................. 2005-111704

(51) Int. Cl.
*F01N 3/00* (2006.01)
(52) U.S. Cl. .............................. 60/295; 60/285; 60/297; 60/311; 55/DIG. 30
(58) Field of Classification Search .................. 60/285, 60/286, 295, 297, 311, 274; 55/DIG. 30
See application file for complete search history.

(56) References Cited

U.S. PATENT DOCUMENTS

| | | | |
|---|---|---|---|
| 6,622,480 B2 * | 9/2003 | Tashiro et al. ................. 60/295 |
| 6,708,487 B2 * | 3/2004 | Morimoto et al. ............. 60/311 |
| 6,735,941 B2 * | 5/2004 | Saito et al. ................... 60/295 |
| 6,928,809 B2 * | 8/2005 | Inoue et al. .................. 60/297 |
| 7,197,868 B2 * | 4/2007 | Yahata et al. ................. 60/297 |

FOREIGN PATENT DOCUMENTS

| | | |
|---|---|---|
| JP | 7-332065 | 12/1995 |
| JP | 2001-280118 | 10/2001 |

* cited by examiner

*Primary Examiner*—Binh Q. Tran
(74) *Attorney, Agent, or Firm*—Nixon & Vanderhye P.C.

(57) ABSTRACT

A diesel particulate filter (DPF) for trapping exhaust particulates is located in an exhaust passage of a diesel engine. Deposit amounts of a soluble organic fraction (SOF) as an organic solvent soluble component and soot as a solid carbon component of exhaust particulate components deposited in the DPF are estimated respectively. When the SOF deposit amount reaches an SOF elimination execution deposit amount, the DPF is heated to or over relatively low SOF combustion temperature to execute SOF elimination treatment. When the soot deposit amount reaches a soot elimination execution deposit amount, the DPF is heated to or over relatively high soot combustion temperature to execute soot elimination treatment. The SOF elimination treatment is executed before the SOF becomes excessive to prevent rapid combustion of the soot due to combustion of the SOF.

14 Claims, 7 Drawing Sheets

EXHAUST GAS PURIFICATION DEVICE OF INTERNAL COMBUSTION ENGINE

CROSS REFERENCE TO RELATED APPLICATION

This application is based on and incorporates herein by reference Japanese Patent Application No. 2005-111704 filed on Apr. 8, 2005.

BACKGROUND OF THE INVENTION

1. Field of the Invention

The present invention relates to an exhaust gas purification device for an internal combustion engine having a particulate filter for trapping exhaust particulates discharged from the engine. In particular, the present invention relates to deposit amount calculation of each component of exhaust particulates and regeneration treatment of a particulate filter of an exhaust gas purification device for an internal combustion engine.

2. Description of Related Art

For environmental protection, an exhaust gas purification device is introduced to reduce air pollutants discharged from an exhaust port of an internal combustion engine. As a conventional exhaust gas purification device, a catalyst system such as an oxidation catalyst, a $NO_x$ catalyst or a three-way catalyst is publicly known. Further, elimination of exhaust particulates contained in exhaust gas of a diesel engine is required. For the elimination of the particulates, an exhaust gas purification device having a particulate filter in an exhaust passage is put into practice. The particulate filter traps the exhaust particulates in the exhaust gas by forcing the exhaust gas to pass through porous partition walls. The trapped exhaust particulates deposit on surfaces or in fine bores of the partition walls.

If a particulate deposit amount becomes excessive, a flow resistance in the particulate filter is increased and a back pressure of the internal combustion engine is increased. As a result, an engine output is reduced. In order to avoid this problem, regeneration treatment of the particulate filter (regeneration treatment for eliminating the particulates) is executed on a regular basis to burn and eliminate the deposited exhaust particulates. In the regeneration treatment of the particulate filter, it is required to accurately estimate the particulate deposit amount and to execute the regeneration treatment at appropriate timing.

JP-A-H07-332065 describes that, on a basis that a pressure loss in the particulate filter increases due to deposition of the exhaust particulates, a particulate deposit amount is obtained from a pressure difference across the particulate filter. Since the pressure difference depends on an exhaust gas flow amount, it is preferable to calculate the particulate deposit amount based upon the pressure difference and the exhaust gas flow amount. The regeneration treatment is executed if it is determined that the regeneration treatment is necessary when the particulate deposit amount exceeds a predetermined value.

JP-A-2001-280118 describes an apparatus that has an oxidation catalyst upstream of a particulate filter and treats trapped exhaust particulates by nitrogen dioxide ($NO_2$) generated by oxidizing nitrogen monoxide (NO) in the exhaust gas. Thus, the apparatus continually regenerates the particulate filter. This apparatus calculates a particulate discharge amount from engine operation information and calculates a particulate combustion amount from particulate filter temperature information. The apparatus integrates a difference between the calculated particulate discharge amount and the calculated particulate combustion amount to determine a particulate deposit amount in the particulate filter. The apparatus calculates the particulate discharge amount and the particulate combustion amount by using a particulate discharge amount map and a particulate combustion amount map stored in a controller beforehand.

Generally, particulates deposited in the particulate filter are comprised of solid soot (carbon) and a liquid organic solvent soluble component (soluble organic fraction (SOF): hydrocarbon) adhering to the periphery of the soot. The soot has high combustion temperature (for example, 600° C. or higher) and does not cause spontaneous combustion frequently during operation. However, the SOF burns at relatively low temperature (for example, 250° C. or higher). Therefore, in the case where a large amount of the SOF is deposited, there is a possibility that heat generated in the combustion of the SOF triggers rapid combustion of the soot even if exhaust gas temperature is low. As a result, a filter substrate or a catalyst is damaged if the temperature of the particulate filter is increased to high temperature over allowable limit temperature.

Exhaust gas temperature of 250° C., which causes the combustion of the SOF, frequently occurs during normal running of a vehicle. Accordingly, it is required to prevent abnormal combustion of the soot due to the SOF combustion in order to use the particulate filter safely. JP-A-H07-332065 uses the pressure difference across the particulate filter to obtain the particulate deposit amount. The pressure difference is strongly associated with the soot deposit amount. However, the pressure difference is not strongly associated with the SOF amount. Therefore, it is difficult to estimate the SOF deposit amount based upon the pressure difference. JP-A-2001-280118 obtains the amount of particulate deposits containing the SOF and the soot without discriminating the SOF and the soot. Accordingly, if the regeneration treatment is executed in an early stage in order to avoid the above-described problem, fuel consumption deteriorates due to an increase of frequency of the regeneration treatment. As described above, according to the conventional art, it is difficult to grasp the SOF deposit amount and to carry out the regeneration treatment at appropriate timing in such a manner as not to induce rapid combustion of the soot.

SUMMARY OF THE INVENTION

It is an object of the present invention to provide an exhaust gas purification device for an internal combustion engine capable of accurately estimating deposit amounts of SOF and soot respectively and of carrying out regeneration treatment of a particulate filter at appropriate timing while preventing rapid combustion of the soot due to the combustion of the SOF, thereby improving safety and enabling the regeneration treatment of the particulate filter without reducing an engine output or deteriorating engine fuel economy.

According to an aspect of the present invention, an exhaust gas purification device for an internal combustion engine has a particulate filter in an exhaust passage for trapping exhaust particulates contained in exhaust gas and eliminates the exhaust particulates deposited in the particulate filter at predetermined timing to regenerate the particulate filter. The exhaust gas purification device includes a first estimation device, a second estimation device, a regeneration determination device, and a regeneration treatment device. The first estimation device estimates a deposit amount of a soluble organic fraction as an organic solvent soluble component out of exhaust particulate components deposited in the particulate filter. The second estimation device estimates a deposit amount of soot as a solid carbon component out of the exhaust particulate components deposited in the particulate filter. The regeneration determination device determines whether elimination treatment for eliminating the soluble organic fraction or the soot from the particulate filter is necessary based on an estimate of the deposit amount estimated by the first or second estimation device. The regeneration treatment device increases temperature of the particulate filter to or over combustion temperature of the soluble organic fraction or the soot to regenerate the particulate filter when it is determined that the elimination treatment of the soluble organic fraction or the soot is necessary.

The deposit amounts of the SOF and the soot as the particulate components are estimated separately. The temperature of the particulate filter is increased to execute the elimination treatment for eliminating the SOF from the particulate filter before the SOF deposit amount becomes excessive. Rapid combustion of the soot due to the combustion of the SOF is prevented to suppress an excessive increase of the particulate filter temperature. The soot deposit amount may be estimated from a relation to a pressure difference across the particulate filter or from a relation to an operating condition of the engine or the particulate filter temperature. The SOF deposit amount may be estimated from a relation to an operating condition of the engine or the particulate filter temperature. Thus, the regeneration treatment of the particulate filter is executed at appropriate timing. As a result, the particulate filter can be used safely, while inhibiting reduction of an engine output or deterioration of fuel economy.

BRIEF DESCRIPTION OF THE DRAWINGS

Features and advantages of an embodiment will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENT

An example embodiment of the present invention will be explained with reference to FIGS. 1 to 12.

Figure 1:
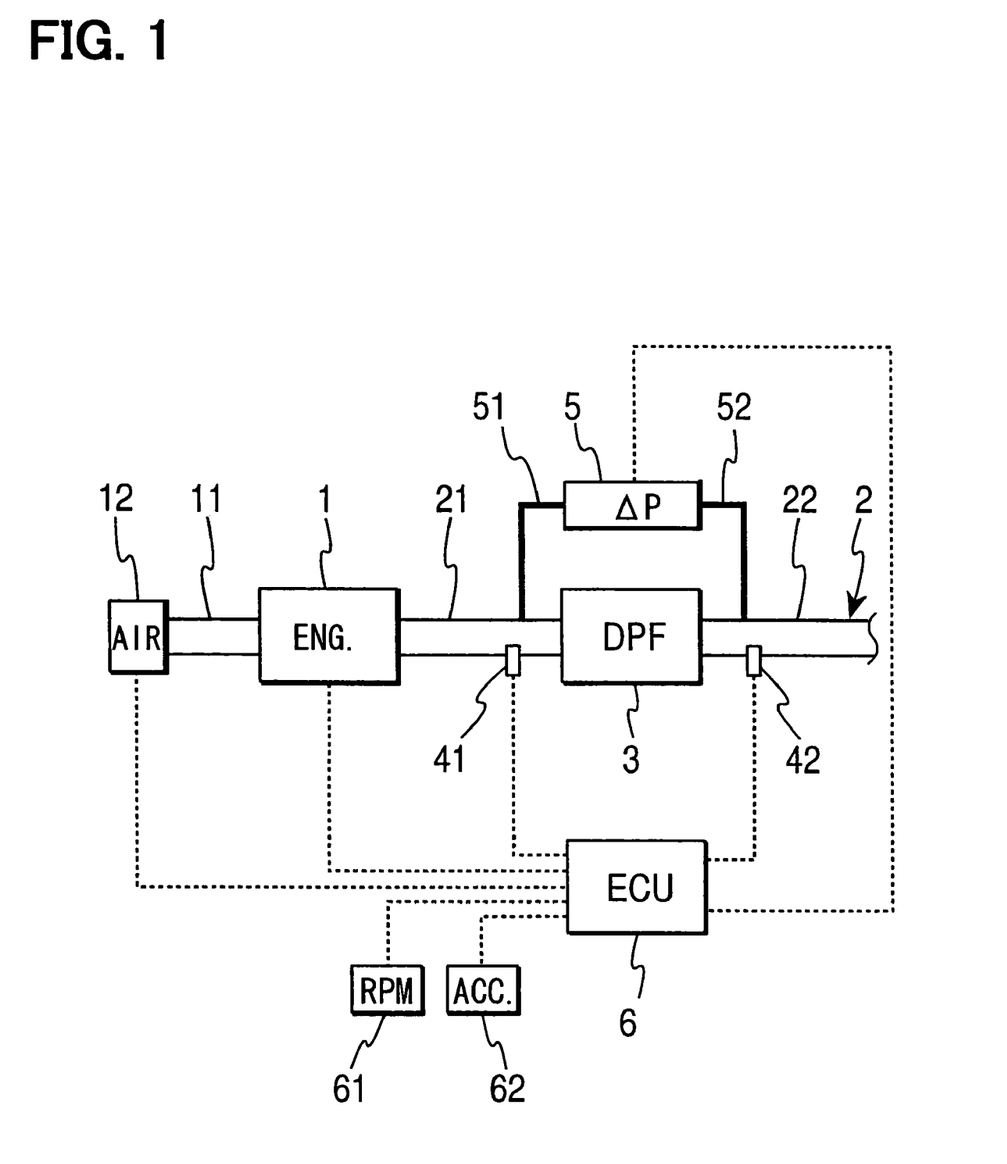
FIG. 1 is a schematic diagram showing an exhaust gas purification device for an internal combustion engine according to an example embodiment of the present invention.

Referring to FIG. 1, an exhaust gas purification device for a diesel engine according to the example embodiment of the present invention is illustrated. The diesel engine 1 is connected with an intake passage 11 for supplying intake air into an engine combustion chamber and with an exhaust passage 2, through which exhaust gas discharged from the engine combustion chamber flows. An air flow meter 12 is located in the intake passage 11 to measure an amount of the intake air flowing through the intake passage 11. A diesel particulate filter (DPF) 3 is located in the exhaust passage 2.

The DPF 3 has a filter main body, which is formed of a porous ceramic such as cordierite or silicon carbide molded in a honeycomb shape. Each one of flow paths of the filter main body is blocked on an inlet side or an outlet side. The exhaust gas discharged from the engine 1 into an exhaust passage 21 upstream of the DPF 3 flows into the flow paths of the DPF 3 and flows through porous partition walls to an exhaust passage 22 downstream of the DPF 3. At that time, exhaust particulates contained in the exhaust gas are trapped in the DPF 3 and deposited therein as an operating time passes. The DPF 3 may be structured such that an oxidation catalyst, a main component of which is a noble metal such as platinum or palladium, is supported on a porous ceramic surface constituting the filter main body, thereby stably oxidizing and combusting the deposited exhaust particulates in a low temperature range of the DPF 3.

Temperature sensors 41, 42 for measuring exhaust gas temperature are located in the exhaust passage 2 in such a manner as to penetrate through a wall of the exhaust passage 2. The temperature sensor 41 is located in the exhaust passage 21 upstream of the DPF 3 to measure temperature (DPF inlet temperature) of the exhaust gas flowing right upstream of an inlet of the DPF 3. The temperature sensor 42 is located in the exhaust passage 22 downstream of the DPF 3 to measure temperature (DPF outlet temperature) of the exhaust gas flowing right downstream of an outlet of the DPF 3. Measurement signals of the temperature sensors 41, 42 are input to an electronic control unit (ECU) 6 controlling respective parts of the engine 1.

The ECU 6 obtains DPF temperature from the DPF inlet temperature and the DPF outlet temperature. The DPF temperature represents the DPF 3 and is obtained by producing an average of an output, which is produced by performing first-order lag filter calculation of the DPF inlet temperature, and the DPF outlet temperature, for example. The DPF inlet temperature largely fluctuates depending on a discharged state of the exhaust gas from an engine main body. Therefore, the first-order lag filter calculation of the DPF inlet temperature is performed to eliminate the influence. Depending on a required specification, the DPF temperature may be an average or a weighted average of the DPF inlet temperature and the DPF outlet temperature as long as the temperature represents the DPF 3.

The exhaust passage 2 is provided with a first branch passage 51 branching from the exhaust passage 21 right upstream of the DPF 3 and a second branch passage 52 branching from the exhaust passage 22 right downstream of the DPF 3. A pressure difference sensor 5 is interposed between the branch passages 51, 52. The pressure difference sensor 5 measures a pressure difference of the exhaust gas between an inlet side and an outlet side of the DPF 3 introduced through the branch passages 51, 52 and outputs the pressure difference to the ECU 6. The pressure difference increases as the amount of the exhaust particulates trapped in the DPF 3 increases and a pressure loss increases.

In addition to output signals from the air flow meter 12, the temperature sensors 41, 42 and the pressure difference sensor 5, other various signals indicating operating conditions are input to the ECU 6. For example, engine rotation speed is obtained from an output signal of an engine rotation sensor 61 and an accelerator position is obtained from an output signal of an accelerator position sensor 62. The ECU 6 calculates an optimum fuel injection amount in accordance with the operating condition of the engine 1 obtained from the output signals of the various sensors and thereby feedback-controls an injector (not shown) and the like.

The ECU 6 calculates a deposit amount of exhaust particulates and controls the regeneration of the DPF 3 based on the operating condition of the engine 1 obtained from the engine rotation sensor 61 and the accelerator position sensor 62, the intake amount measured by the air flow meter 12, or the pressure difference across the DPF 3 measured by the pressure difference sensor 5. In general, components of exhaust particulates deposited in the DPF 3 include two kinds of components, i.e., an organic solvent soluble component (soluble organic fraction: SOF), and a solid carbon component (soot). The SOF is generated from unburned fuel or oil and consists mainly of hydrocarbon. The SOF combusts at low temperature around 250° C. The soot is generated by carbonizing fuel at high temperature and consists mainly of carbon. The soot combusts at high temperature of 600° C. or higher.

In this example embodiment, in order to avoid adverse effects due to excessive deposition of the SOF, a deposit amount of the SOF and a deposit amount of the soot are estimated separately. Elimination execution deposit amounts M1, M2 are set respectively for the estimated deposit amounts of the SOF and the soot to determine whether execution of regeneration treatment of the DPF 3 is necessary. SOF elimination treatment is executed when the SOF deposit amount becomes equal to or greater than the elimination execution deposit amount M1. Soot elimination treatment is executed when the soot deposit amount becomes equal to or greater than the elimination execution deposit amount M2. The SOF elimination treatment is executed by increasing the temperature of the DPF 3 over temperature enabling the SOF to combust (for example, 250° C. or higher). The soot elimination treatment is executed by increasing the temperature of the DPF 3 over temperature enabling the soot to combust (for example, 600° C. or higher). The execution of the SOF elimination treatment is prioritized over the execution of the soot elimination treatment to prevent an excess of the SOF deposit amount. Thus, the soot is combusted safely.

As means for increasing the temperature of the DPF 3, well-known methods of heating the exhaust gas may be adopted. For example, when the injector injects the fuel, injection timing may be delayed to reduce heat cycle efficiency and to increase a waste heat. Alternatively, a post-injection may be performed to supply unburned fuel to the exhaust passage 2. Alternatively, an intake throttle valve may be controlled to a position closer to a closed position than usual.

Figure 2:
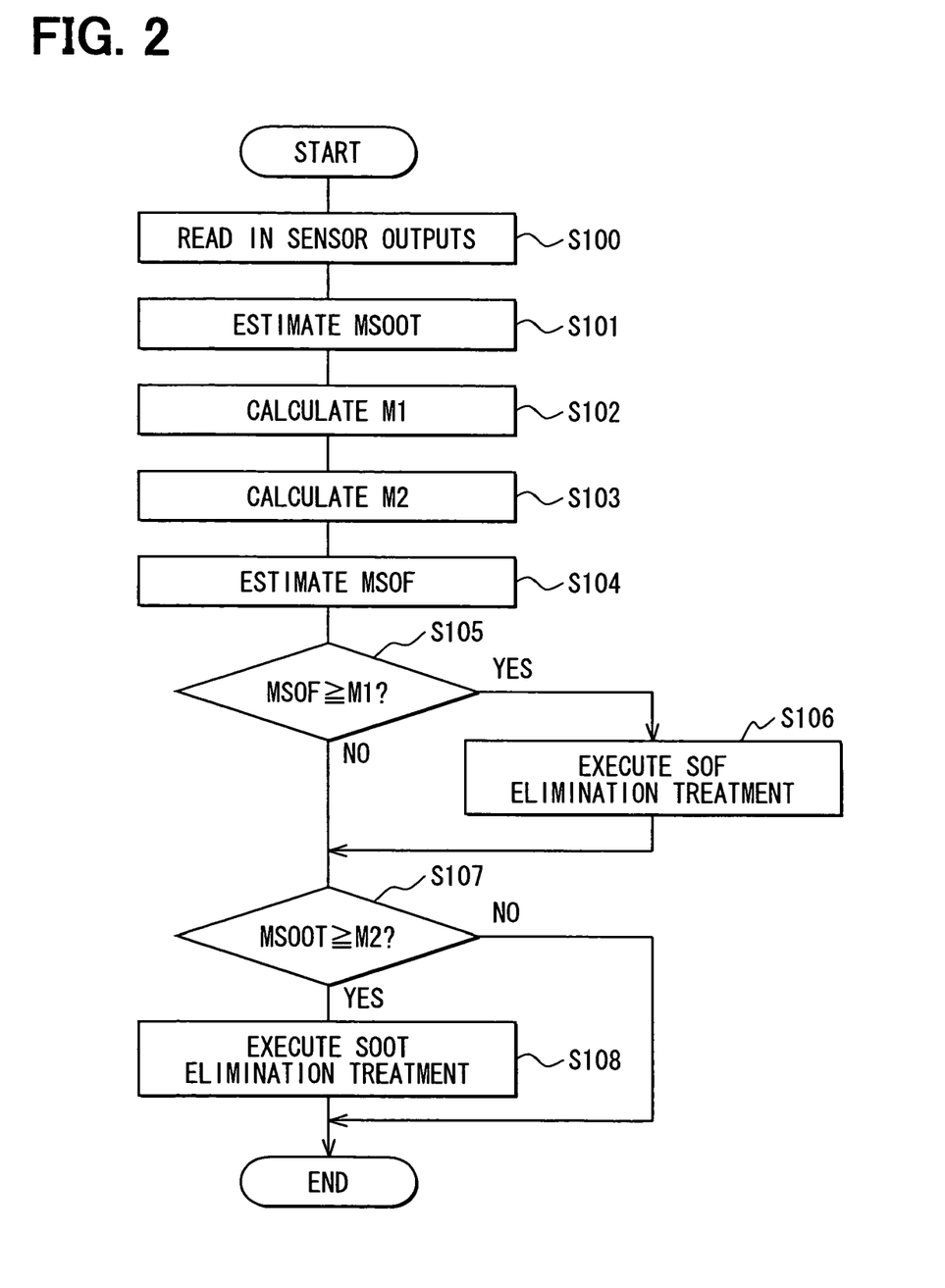
FIG. 2 is a flow chart showing control contents of particulate filter regeneration treatment executed by an electronic control unit constituting the exhaust gas purification device according to the FIG. 1 embodiment.

FIG. 2 shows control contents executed by the ECU 6 in regard to regeneration treatment of DPF 3. First, Step S100 reads in the intake air amount, the DPF temperature, the pressure difference, the engine rotation speed and the accelerator position from output signals of the various sensors such as the air flow meter 12, the temperature sensors 41, 42, the pressure difference sensor 5, the engine rotation sensor 61 and the accelerator position senor 62. The intake air amount is read as a mass flow amount in this example embodiment.

Figure 3:
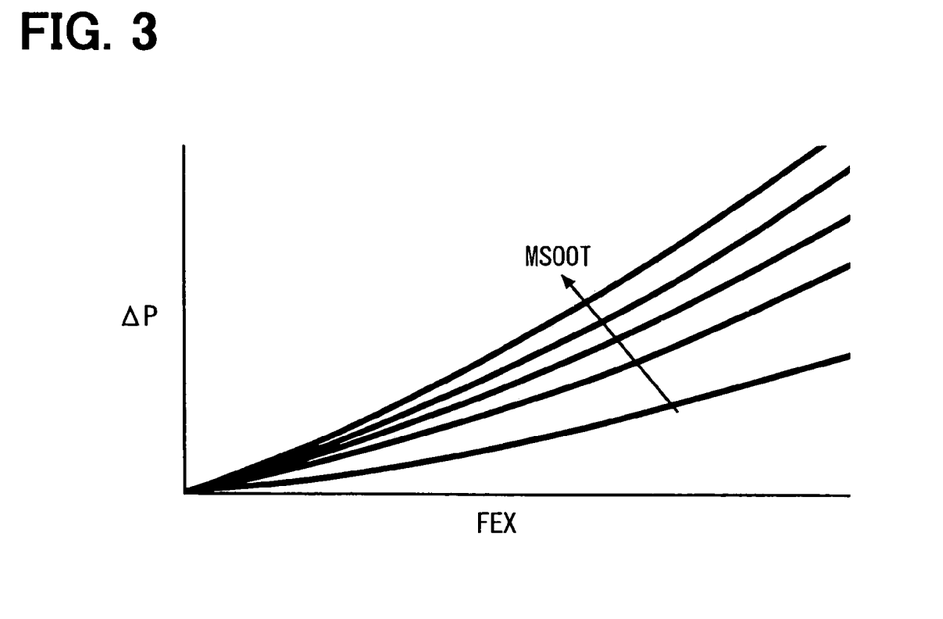
FIG. 3 is a graph showing a relation between a pressure difference across the particulate filter and a soot deposit amount with respect to an exhaust flow amount passing through the particulate filter.
Figure 4:
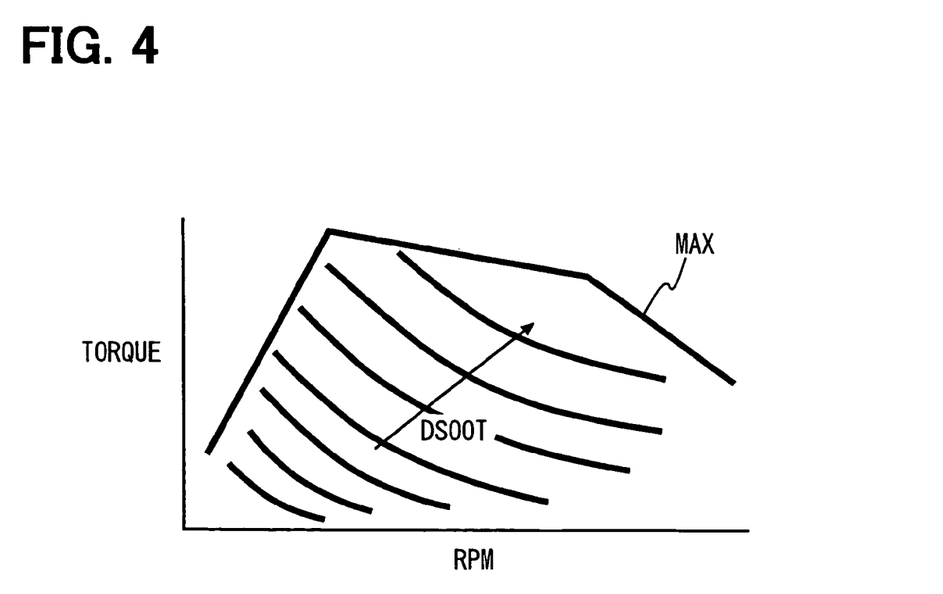
FIG. 4 is a graph showing a relation of a soot discharge amount to engine rotation speed and engine output torque.
Figure 5:
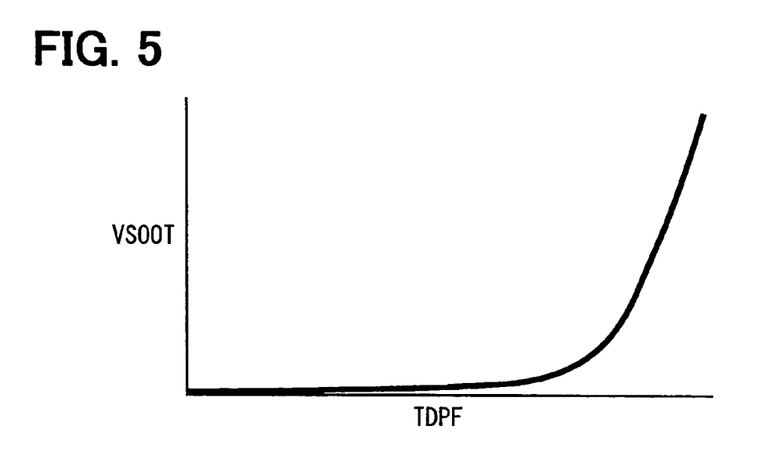
FIG. 5 is a graph showing a relation between a soot combustion velocity and particulate filter temperature.

Step S101 estimates a soot deposit amount MSOOT based upon the sensor outputs read at step S100. For example, the soot deposit amount MSOOT may be estimated by a combination of a method of estimating the amount from a relation between the pressure difference $\Delta P$ across the DPF 3 and the soot deposit amount MSOOT with respect to the exhaust flow amount FEX and a method of estimating the amount by integrating a difference between a soot discharge amount DSOOT discharged from the engine 1 and a soot combustion amount combusted in the DPF 3. A relation between the pressure difference $\Delta P$ across the DPF 3 and the soot deposit amount MSOOT with respect to the exhaust flow amount FEX is shown in FIG. 3. A relation of the soot discharge amount DSOOT to the engine rotation speed RPM and engine output torque is shown in FIG. 4. A solid line MAX in FIG. 4 indicates the maximum engine output torque. A relation between a soot combustion velocity VSOOT and DPF temperature TDPF is shown in FIG. 5. Generally, the former method based on an actual measurement value has higher estimation accuracy than the latter method. However, the former method becomes less accurate depending on operating conditions. Therefore, the former method should be preferably used only when the estimation accuracy is high (for example, when the exhaust gas flow amount is large and the engine is in a constant operating period), and the latter method should be preferably used in the other cases. The estimation may be performed by using either one of the two methods.

In a relation between the pressure difference $\Delta P$ across the DPF 3 and the soot deposit amount MSOOT shown in FIG. 3, each one of curves in FIG. 3 indicates the exhaust flow amount FEX and the pressure difference $\Delta P$ providing the same soot deposit amount MSOOT. When the exhaust flow amount FEX is constant, the pressure difference $\Delta P$ increases as the soot deposit amount MSOOT increases. This relation is stored in advance in a ROM of the ECU 6 as a map. Thus, the soot deposit amount MSOOT is calculated based upon the intake air flow amount measured by the air flow meter 12 and the pressure difference $\Delta P$ across the DPF 3 measured by the pressure difference sensor 5. The exhaust flow amount FEX is calculated by converting the intake air flow amount as a mass flow amount into a volume flow amount based upon the DPF temperature TDPF and the pressure difference $\Delta P$.

As shown in FIG. 3, the pressure difference $\Delta P$ decreases as the exhaust flow amount FEX decreases for the same soot deposit amount MSOOT. The pressure difference $\Delta P$ is apt to fluctuate in a transient operation period when the exhaust flow amount FEX fluctuates. In such cases, the estimation by the latter method is more accurate. As shown in FIG. 4, the soot discharge amount DSOOT discharged from the engine 1 correlates with the engine rotation speed RPM and the output torque. The soot discharge amount DSOOT per unit time increases as the engine rotation speed RPM or the output torque increases. Therefore, this relation is mapped in advance to calculate the soot discharge amount DSOOT based upon measurement values of the engine rotation sensor 61 and the accelerator position sensor 62. As shown in FIG. 5, if the DPF temperature TDPF exceeds a predetermined temperature, the soot starts combusting and the soot combustion velocity VSOOT increases as the DPF temperature TDPF increases. Accordingly, the soot combustion amount in the DPF 3 is calculated from the DPF temperature TDPF obtained with the temperature sensors 41, 42 based upon this relation. The difference between the soot combustion amount and the soot discharge amount DSOOT is integrated to estimate the soot deposit amount MSOOT.

Figure 10:
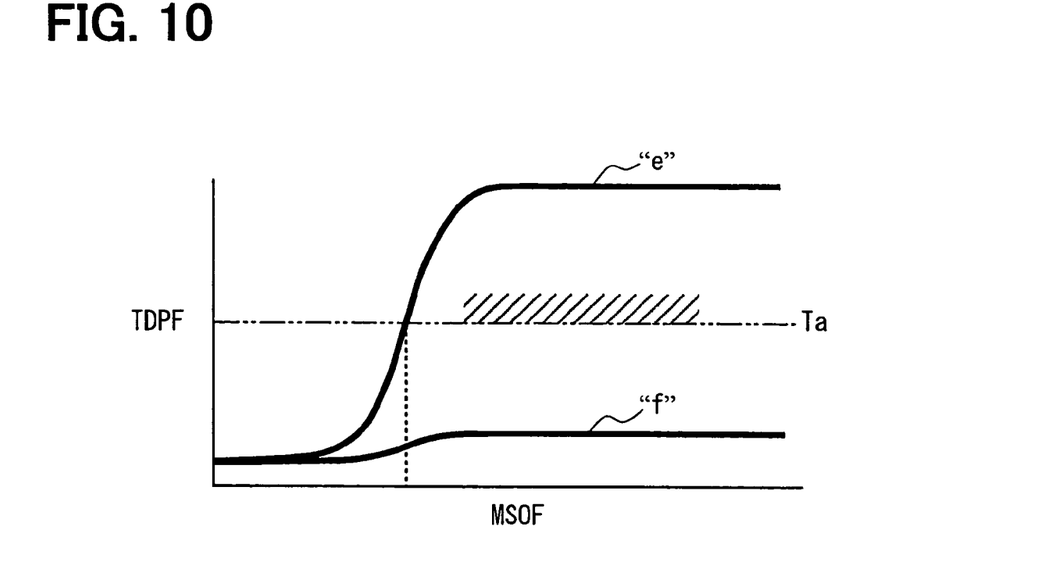
FIG. 10 is a graph showing highest particulate filter temperature during an acceleration operating period.
Figure 11:
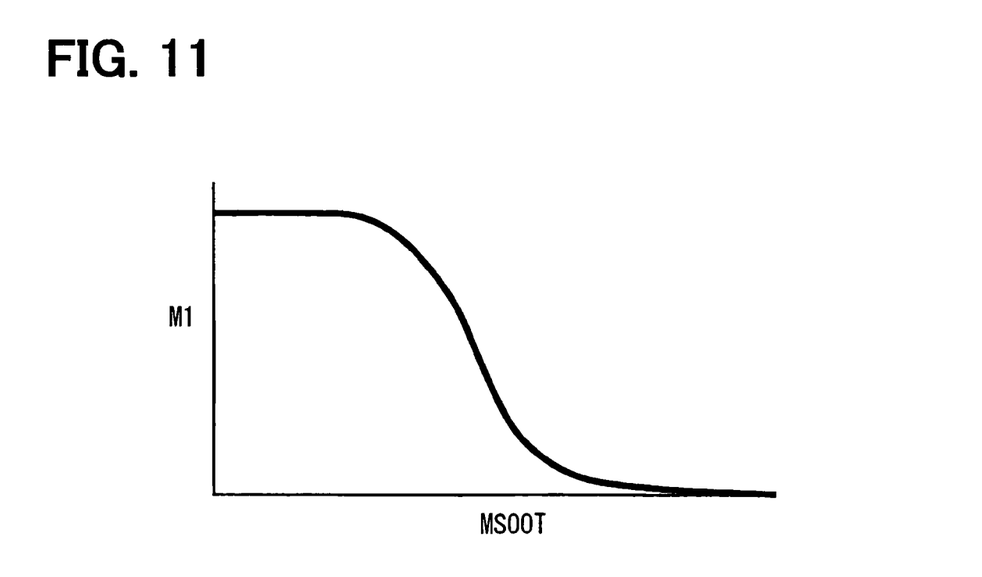
FIG. 11 is a graph showing a relation between a soot deposit amount and an SOF elimination execution deposit amount according to the FIG. 1 embodiment.

Step S102 calculates an SOF elimination execution deposit amount M1, at which SOF elimination treatment is necessary, from the soot deposit amount MSOOT estimated at step S101 based upon FIG. 11. This processing is executed to perform elimination treatment of the SOF in an early stage and to avoid a rapid increase of the DPF temperature TDPF, because the DPF temperature TDPF is apt to rapidly increase due to combustion of the SOF when the soot deposit amount MSOOT becomes large. The SOF elimination execution deposit amount M1 is set at a smaller value as the soot deposit amount MSOOT increases as shown in FIG. 11. Next, this method will be explained with reference to FIGS. 8 to 10.

Figure 8:
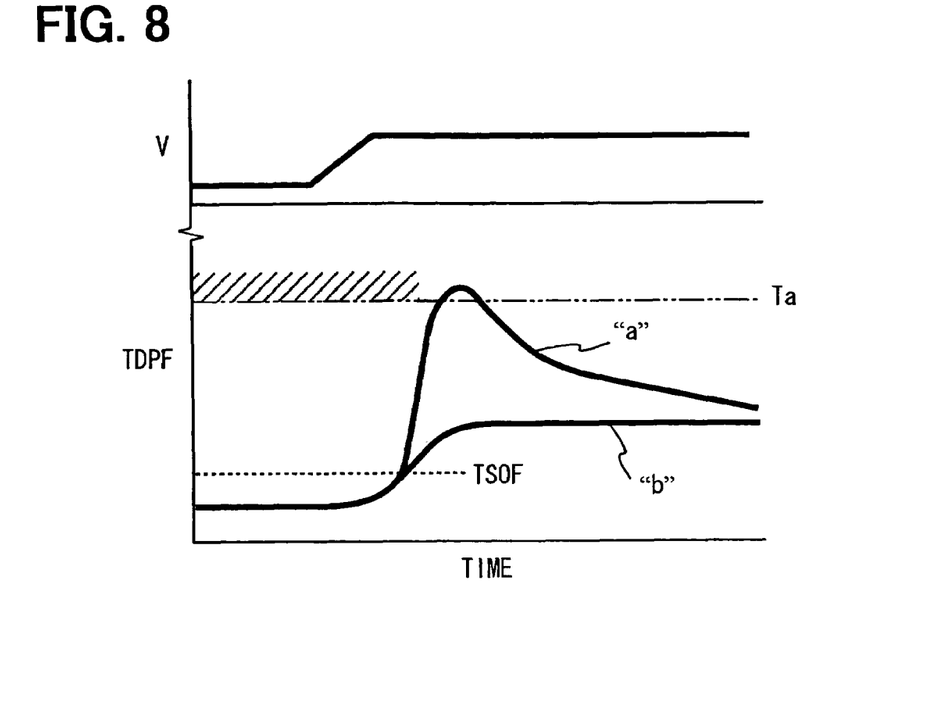
FIG. 8 is a time chart showing a change of the particulate filter temperature during an acceleration operating period.

FIG. 8 is a chart showing a DPF temperature change during an accelerating operation period and shows a comparison between a case of a small SOF deposit amount and a case of a large SOF deposit amount at the time when the soot deposit amount is large. In FIG. 8, a sign V represents vehicle speed. In the case of the large SOF deposit amount, the SOF combusts and the soot rapidly combusts due to combustion of the SOF as a source of fire when exhaust gas temperature exceeds the SOF combustion temperature TSOF, at which the SOF combusts, during the accelerating operation period. As a result, the DPF temperature TDPF rapidly increases and exceeds allowable temperature Ta as shown by a solid line "a" in FIG. 8. Since the SOF combusts at relatively low temperature of 250° C. or higher, this event can occur easily not only under a particular operating condition but also even in a normal accelerating operation. However, even in the case where a large amount of the soot is deposited similarly, the DPF temperature TDPF does not increase over the allowable temperature Ta when the SOF deposit amount is small as shown by a solid line "b" in FIG. 8. It is because soot combustion temperature, at which the soot combusts, is relatively high and the soot does not combust under a normal operating condition but for the SOF as a source of fire.

Figure 9:
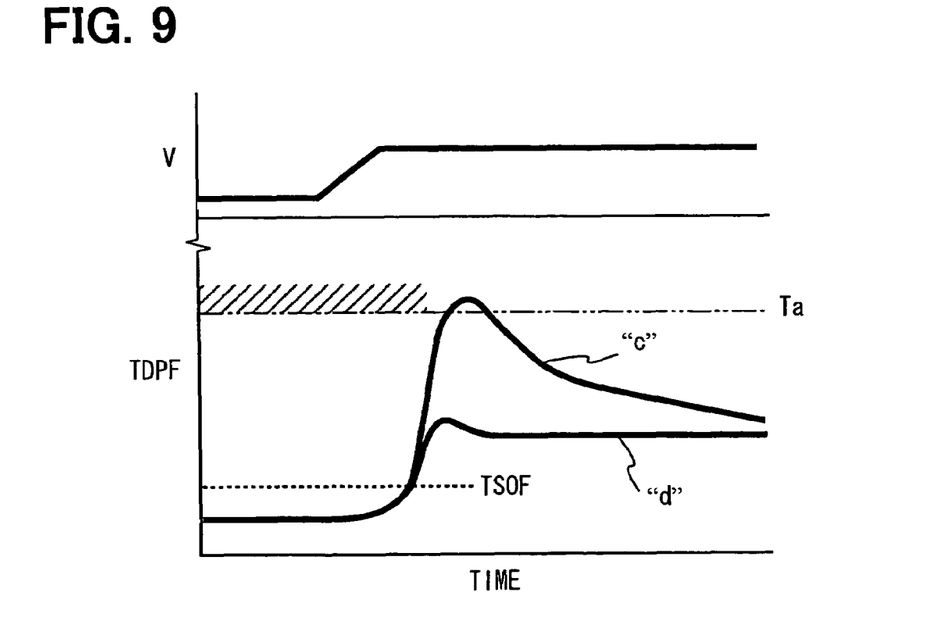
FIG. 9 is a time chart showing a change of the particulate filter temperature during an acceleration operating period.

FIG. 9 is a chart showing the DPF temperature TDPF during an accelerating operation period in a case of a large SOF deposit amount and shows a comparison between a case of a small soot deposit amount and a case of a large soot deposit amount. In the case of the large soot deposit amount, the SOF combusts and the soot rapidly combusts due to the combustion of the SOF as a source of fire when the exhaust gas temperature exceeds the SOF combustion temperature TSOF during a vehicle accelerating period. As a result, the DPF temperature TDPF rapidly increases and exceeds the allowable temperature Ta as shown by a solid line "c" in FIG. 9. Since the SOF combusts at relatively low temperature of 250° C. or higher, this event can easily occur not only under a particular operating condition but also even in a normal accelerating operation. The DPF temperature TDPF does not exceed the allowable temperature Ta when the soot deposit amount is small as shown by a solid line "d", even if a large amount of the SOF is deposited similarly. It is because the soot combustion is not induced by the combustion of the SOF even if the SOF combusts in this case.

FIG. 10 is a graph showing the highest DPF temperature HTDPF during an accelerating operation period. The highest DPF temperature HTDPF increases as the SOF deposit amount MSOF increases. The highest DPF temperature HTDPF does not exceed the allowable temperature Ta if the soot deposit amount MSOOT is small as shown by a solid line "f" in FIG. 10. However, heat generated due to the SOF combustion serves as a source of fire to cause rapid combustion of the soot when the soot deposit amount MSOOT is large. Therefore, there is a possibility that the DPF 3 is heated to abnormally high temperature. If the temperature of the DPF 3 exceeds the allowable temperature Ta as shown by a solid line "e" in FIG. 10, there is a possibility that the DPF 3 or the catalyst on the surface of the DPF 3 is damaged.

FIG. 11 shows a relation between the soot deposit amount MSOOT and the SOF elimination execution deposit amount M1, at which the regeneration can be executed safely. The SOF elimination is executed when a relatively small amount of the SOF is deposited in the case where the soot deposit amount MSOOT is large.

Step S103 calculates a soot elimination execution deposit amount M2, at which the soot elimination is necessary. In this example embodiment, the soot elimination execution deposit amount M2 is set at a predetermined constant value.

Figure 6:
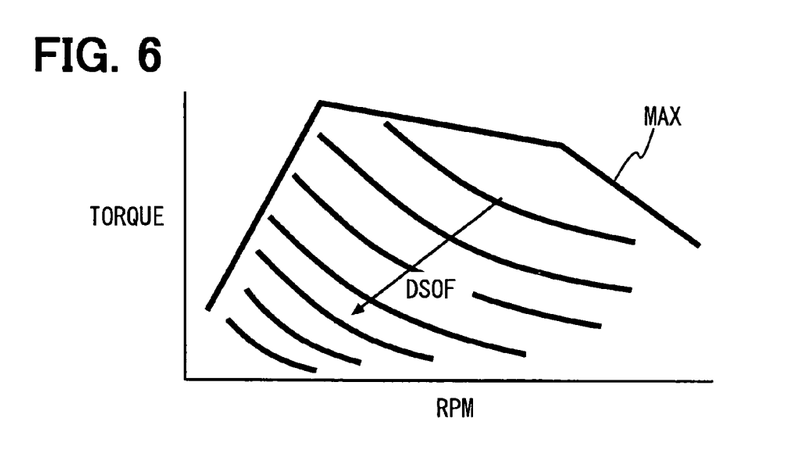
FIG. 6 is a graph showing a relation of an SOF discharge amount to the engine rotation speed and the engine output torque.
Figure 7:
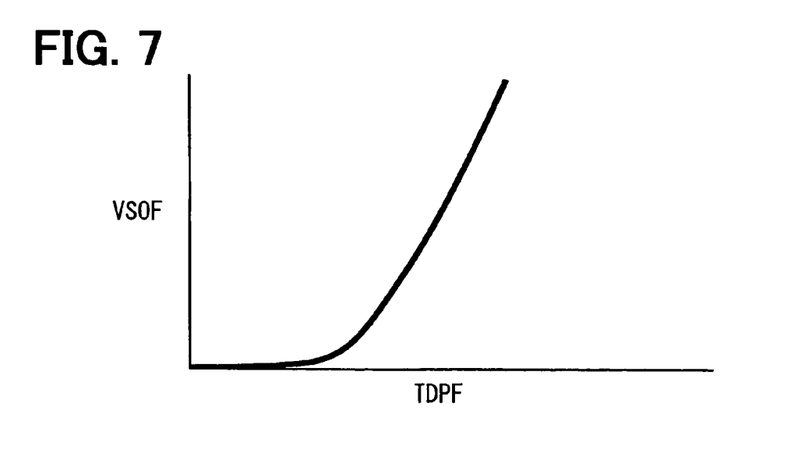
FIG. 7 is a graph showing a relation between an SOF combustion velocity and the particulate filter temperature.

Step S104 estimates the SOF deposit amount MSOF based upon the sensor outputs read at step S100. For example, as shown in FIG. 6, the SOF discharge amount DSOF discharged from the engine 1 correlates with the engine rotation speed RPM and the output torque. The SOF discharge amount DSOF per unit time decreases as the engine rotation speed RPM or the output torque increases. As shown in FIG. 7, when the DPF temperature TDPF exceeds a predetermined temperature, the SOF starts combusting and SOF combustion velocity VSOF increases as the DPF temperature TDPF increases. This relation is mapped in advance to calculate the SOF discharge amount DSOF based upon measurement values of the engine rotation sensor 61 and the accelerator position sensor 62. The SOF combustion amount combusted in the DPF 3 is calculated from the DPF temperature TDPF obtained with the temperature sensors 41, 42 based upon this relation. A difference between the SOF combustion amount and the SOF discharge amount DSOF is integrated to estimate the SOF deposit amount MSOF.

The SOF discharge amount DSOF from the engine 1 changes in accordance with a heated state of the engine 1. The SOF discharge amount DSOF becomes large when the engine 1 is not heated sufficiently immediately after the engine 1 is started. Therefore, the SOF discharge amount DSOF can be obtained more accurately by performing a correction for increasing the value DSOF shown in FIG. 6 as engine cooling water temperature decreases.

The SOF discharge amount DSOF changes in accordance with an exhaust gas recirculation (EGR) amount, i.e., an amount of exhaust gas recirculated from an exhaust system into an intake system. The SOF discharge amount DSOF increases as the EGR quantity increases. Therefore, the SOF discharge amount DSOF can be obtained more accurately by performing a correction for increasing the value DSOF shown in FIG. 6 as the EGR amount increases.

Step S105 determines whether the SOF deposit amount MSOF estimated at step S104 reaches the SOF elimination execution deposit amount M1 calculated at step S102.

If S105 is "YES," the processing proceeds to step S106. Step S106 executes the SOF elimination treatment by a well-known method such as delaying the fuel injection timing or performing the post-injection. Treatment temperature is set at relatively low temperature (for example, 250° C.), at which the soot does not combust but the SOF combusts. The temperature of the DPF 3 is increased to or over the treatment temperature to combust and to eliminate the SOF.

After execution of Step S106 or if Step S105 is "NO," the processing proceeds to step S107. Step S107 determines whether the soot deposit amount MSOOT estimated at step S101 reaches the soot elimination execution deposit amount M2 calculated at step S103.

If S107 is "YES," the processing proceeds to step S108. Step S108 performs the soot elimination treatment by a well-known method such as delaying the fuel injection timing or performing the post-injection. Treatment temperature is set at relatively high temperature (for example, 600° C.), at which the soot combusts. The temperature of the DPF 3 is increased to or over the treatment temperature to combust and eliminate the soot.

After execution of step S108 or if Step S107 is "NO," the processing ends and returns.

Figure 12:
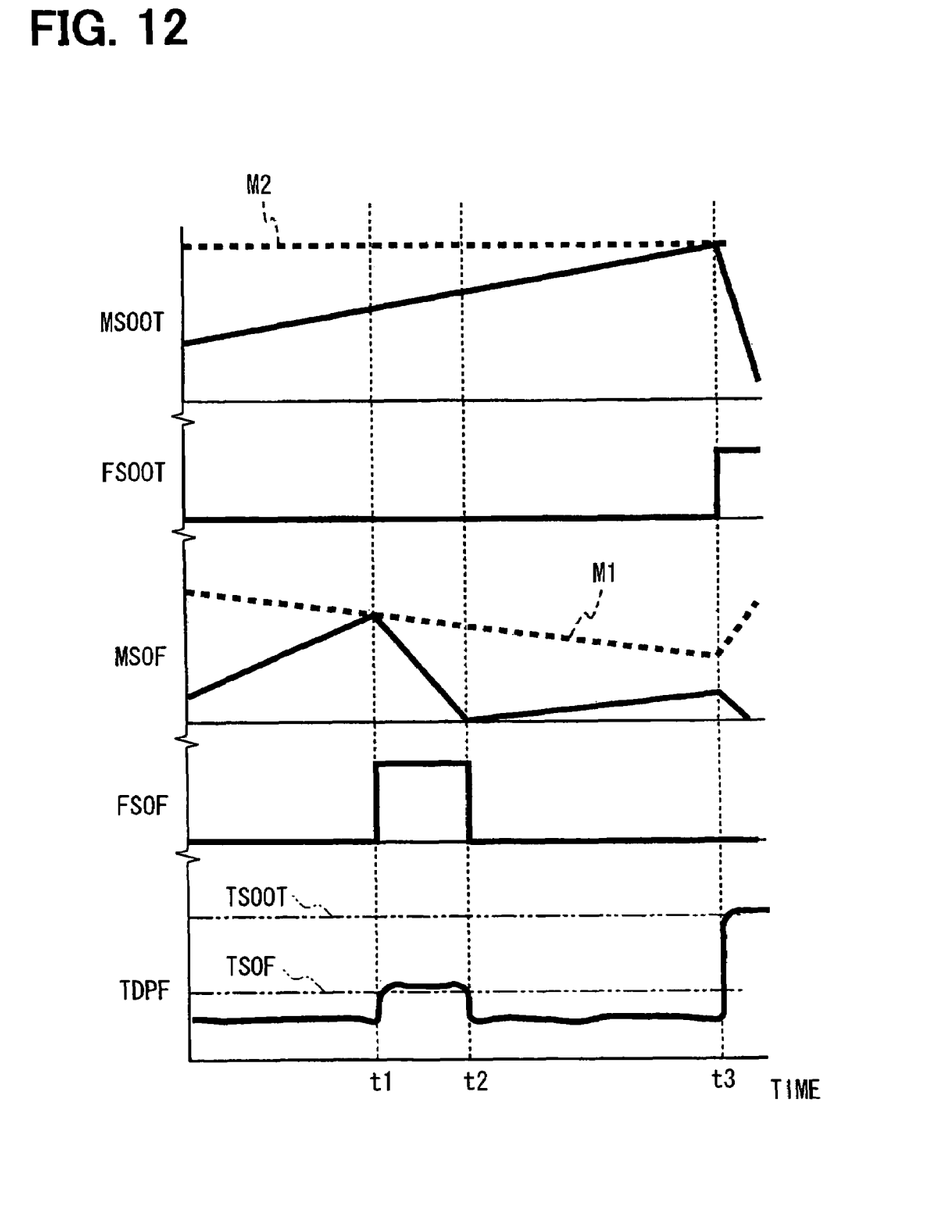
FIG. 12 is a time chart showing an operation according to the FIG. 1 embodiment.

FIG. 12 is a time chart showing effects of the example embodiment in the case where regeneration treatment of the DPF 3 is executed based upon the flow chart of FIG. 2. In FIG. 12, the soot deposit amount MSOOT and the SOF deposit amount MSOF to the DPF 3 increase as a vehicle running time shown by an abscissa axis passes. In this example embodiment, the soot deposit amount MSOOT and the SOF deposit amount MSOF are estimated separately. It is determined anytime whether the SOF deposit amount MSOF reaches the set SOF elimination execution deposit amount M1 or whether the soot deposit amount MSOOT reaches the soot elimination execution amount M2. In the example shown in FIG. 12, the SOF deposit amount MSOF exceeds the SOF elimination execution deposit amount M1 at time t1, and the SOF elimination treatment is executed. A sign FSOF in FIG. 12 indicates an SOF elimination execution flag. This treatment terminates at time t2. Since the SOF elimination treatment is executed at low temperature (around 250° C. or higher), the soot is not combusted but continues to deposit. Then, at time t3, the soot deposit amount MSOOT exceeds the soot elimination execution deposit amount M2, and the soot elimination treatment is executed. A sign FSOOT in FIG. 12 indicates a soot elimination execution flag.

In the conventional technology, it is difficult to estimate the SOF amount out of the exhaust particulates. In the conventional technology, the exhaust particulates including the SOF and the soot are calculated together as an exhaust particulate deposit amount without discriminating between the SOF and the soot, and the DPF 3 is regenerated when the exhaust particulate deposit amount exceeds a predetermined value. Therefore, there is a possibility that the SOF deposit amount increases to induce rapid combustion of the soot or regeneration treatment of the DPF 3 is executed frequently to deteriorate fuel economy.

In contrast, in this example embodiment of the present invention, the soot and the SOF are treated separately, i.e., the soot deposit amount and the SOF deposit amount are estimated separately, and the soot elimination treatment and the SOF elimination treatment are executed separately. Therefore, the regeneration treatment of the DPF 3 can be executed at appropriate timing to avoid adverse effects due to excessive deposition of, particularly, the SOF. As a result, safety is improved.

The present invention should not be limited to the disclosed embodiment, but may be implemented in many other ways without departing from the spirit of the invention.

What is claimed is:

1. An exhaust gas purification device for an internal combustion engine having a particulate filter located in an exhaust passage, through which exhaust gas discharged from the engine flows, for trapping exhaust particulates contained in the exhaust gas, the exhaust gas purification device eliminating the exhaust particulates deposited in the particulate filter at predetermined timing to regenerate the particulate filter, comprising:

a first estimation device that estimates a deposit amount of a soluble organic fraction as an organic solvent soluble component out of exhaust particulate components deposited in the particulate filter, the soluble organic fraction being combustible and removable from the particulate filter at a relatively low temperature;

a second estimation device that estimates a deposit amount of soot as a solid carbon component out of the exhaust particulate components deposited in the particulate filter, the soot being combustible and removable from the particulate filter at a relatively high temperature compared to the soluble organic fraction;

a regeneration determination device that determines whether elimination treatment of the soluble organic fraction from the particulate filter is necessary based upon an estimate of the deposit amount estimated by the first estimation device and whether elimination treatment of the soot from the particulate filter is necessary based upon an estimate of the deposit amount estimated by the second estimation device; and a regeneration treatment device that increases temperature of the particulate filter to or over combustion temperature of the soluble organic fraction to regenerate the particulate filter when it is determined that the elimination treatment of the soluble organic fraction is necessary and that increases the temperature of the particulate filter to or over the combustion temperature of the soot to regenerate the particulate filter when it is determined that the elimination treatment of the soot is necessary.

2. The exhaust gas purification device as in claim 1, wherein the regeneration determination device includes:

a first elimination determination device that determines that the soluble organic fraction elimination treatment is necessary when the estimate of the deposit amount estimated by the first estimation device becomes equal to or greater than a first preset amount; and a second elimination determination device that determines that the soot elimination treatment is necessary when the estimate of the deposit amount estimated by the second estimation device becomes equal to or greater than a second preset amount.

3. The exhaust gas purification device as in claim 2, wherein the first estimation device calculates an amount of the soluble organic fraction discharged from the engine to the exhaust passage and an amount of the soluble organic fraction combusted in the particulate filter and subtracts the combusted amount from the discharged amount to estimate the deposit amount of the soluble organic fraction.

4. The exhaust gas purification device as in claim 2, wherein
the second estimation device estimates the deposit amount of the soot based on a pressure difference between an upstream side and a downstream side of the particulate filter and an exhaust flow amount and/or based on a value provided by subtracting an amount of the soot combusted in the particulate filter from an amount of the soot discharged from the engine.

5. The exhaust gas purification device as in claim 2, wherein
the first elimination determination device includes a setting device that changes the first preset amount in accordance with the deposit amount of the soot estimated by the second estimation deice and sets the first preset amount at a smaller value as the deposit amount of the soot increases.

6. The exhaust gas purification device as in claim 1, wherein
the regeneration treatment device includes a first elimination treatment device that increases the temperature of the particulate filter to soluble organic fraction elimination treatment temperature for the elimination treatment of the soluble organic fraction and a second elimination treatment device that increases the temperature of the particulate filter to soot elimination treatment temperature for the elimination treatment of the soot.

7. An exhaust gas purification device for an internal combustion engine having a particulate filter located in an exhaust passage, through which exhaust gas discharged from the engine flows, for trapping exhaust particulates contained in the exhaust gas, the exhaust gas purification device eliminating the exhaust particulates deposited in the particulate filter at predetermined timing to regenerate the particulate filter, comprising:
a first estimation device that estimates a deposit amount of a soluble organic fraction as an organic solvent soluble component out of exhaust particulate components deposited in the particulate filter;
a second estimation device that estimates a deposit amount of soot as a solid carbon component out of the exhaust particulate components deposited in the particulate filter;
a regeneration determination device that determines whether elimination treatment of the soluble organic fraction or the soot from the particulate filter is necessary based upon an estimate of the deposit amount estimated by the first estimation device or the second estimation device; and
a regeneration treatment device that increases temperature of the particulate filter to or over combustion temperature of the soluble organic fraction or the soot to regenerate the particulate filter when it is determined that the elimination treatment of the soluble organic fraction or the soot is necessary;
wherein the regeneration treatment device includes a first elimination treatment device that increases the temperature of the particulate filter to soluble organic fraction elimination treatment temperature for the elimination treatment of the soluble organic fraction and a second elimination treatment device that increases the temperature of the particulate filter to soot elimination treatment temperature for the elimination treatment of the soot; and
the first elimination treatment device increases the temperature of the particulate filter to the soluble organic fraction elimination treatment temperature lower than the soot elimination treatment temperature attained by the second elimination treatment device.

8. The exhaust gas purification device as in claim 6, wherein;
the regeneration treatment device executes the elimination treatment of the soluble organic fraction with the first elimination treatment device in priority to the elimination treatment of the soot executed by the second elimination treatment device; and
the second elimination treatment device executes the elimination treatment of the soot only when it is estimated that the deposit amount of the soluble organic fraction is lower than a predetermined value.

9. The exhaust gas purification device as in claim 1, wherein the relatively low temperature is approximately 250° C.

10. The exhaust gas purification device as in claim 1, wherein the relatively high temperature is approximately 600° C.

11. A control method of an exhaust gas purification device for an internal combustion engine having a particulate filter located in an exhaust passage, through which exhaust gas discharged from the engine flows, for trapping exhaust particulates contained in the exhaust gas, the control method comprising:
reading engine operation states;
estimating a deposit amount of soot deposited in the particulate filter based on the read engine operation states;
calculating a soluble organic fraction elimination execution deposit amount at which elimination treatment of a soluble organic fraction deposited in the particulate filter is necessary;
calculating a soot elimination execution deposit amount, at which elimination of the soot is necessary;
estimating the deposit amount of the soluble organic fraction based on the read engine operation states;
determining whether the estimated deposit amount of the soluble organic fraction reaches the soluble organic fraction elimination execution deposit amount;
executing a soluble organic fraction elimination treatment if it is determined that the estimated deposit amount of the soluble organic fraction reaches the soluble organic fraction elimination execution deposit amount;
determining whether the estimated soot deposit amount reaches the soot elimination execution deposit amount; and
performing a soot elimination treatment if it is determined that the estimated soot deposit amount reaches the soot elimination execution deposit amount.

12. The control method as in claim 11, wherein the soluble organic fraction elimination execution deposit amount is calculated based on the estimated soot deposit amount.

13. The control method as in claim 11, wherein executing the soluble organic fraction elimination treatment includes increasing the temperature of the particulate filter to at least a soluble organic fraction combustion temperature which is approximately 250° C.

14. The control method as in claim 13, wherein performing the soot elimination treatment includes increasing the temperature of the particulate filter to at least a combustion temperature of the soot which is approximately 600° C.

* * * * *